Jan. 24, 1956 C. B. V. NEILSON ET AL 2,732,152
AIRCRAFT LANDING GEAR WITH MEANS FOR MINIMIZING
WHEEL DRAG LOAD INCIDENT TO LANDING
Filed Nov. 21, 1952
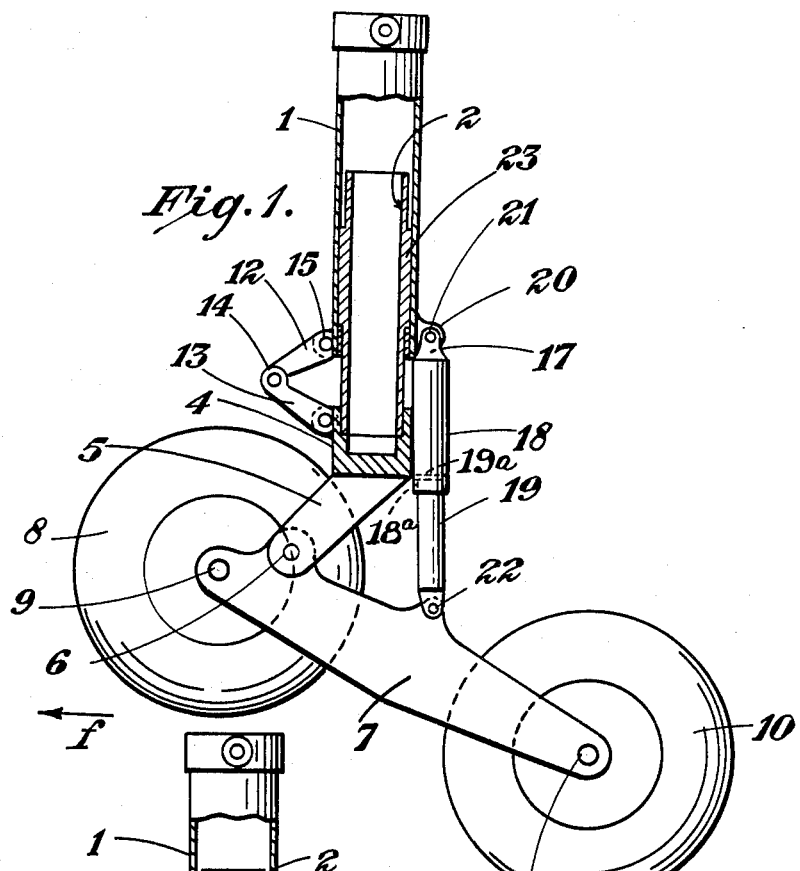
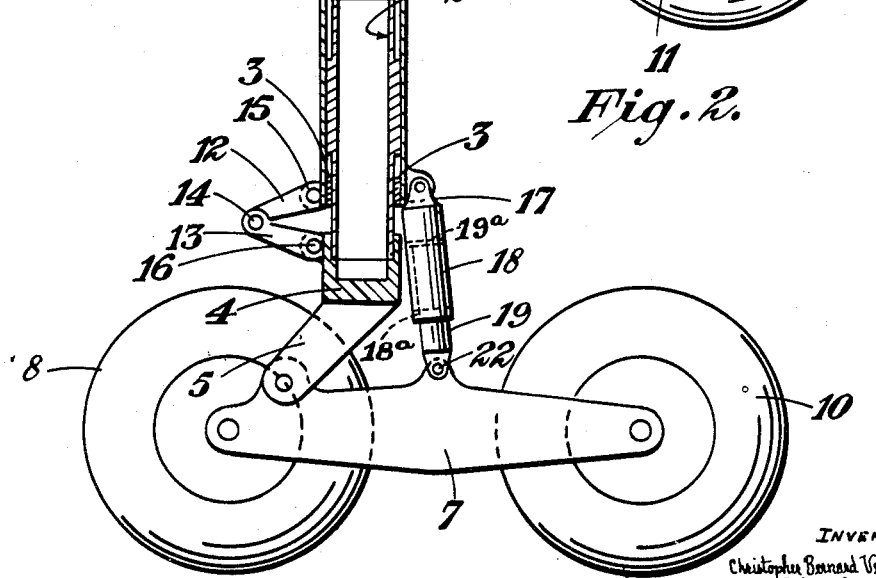
INVENTORS:
Christopher Bernard Vere Neilson
Robert George Hoare
ATTORNEYS:
Baldwin & Wight United States Patent Office 2,732,152
Patented Jan. 24, 1956

2,732,152

AIRCRAFT LANDING GEAR WITH MEANS FOR MINIMIZING WHEEL DRAG LOAD INCIDENT TO LANDING

Christopher Bernard Vere Neilson, Lymm, and Robert George Hoare, Warrington, England, assignors to Electro-Hydraulics Limited, Warrington, England, a company of Great Britain Application November 21, 1952, Serial No. 321,824

Claims priority, application Great Britain June 5, 1947

11 Claims. (Cl. 244—104)

This application is a continuation-in-part of the co-pending applications of Christopher Bernard Vere Neilson and Robert George Hoare, Serial Nos. 48,466, now abandoned; 156,246, filed April 17, 1950, now Patent No. 2,670,160; and 245,192, filed September 5, 1951.

This invention relates to aircraft landing gear, and more particularly to improvements in the construction of such gear by which drag loads incident to landing are minimized.

Modern aircraft, particularly large and heavy airplanes, commonly are equipped with landing gear comprising closely associated sets of wheels grouped in a unit and spaced from each other fore-and-aft, that is, in the direction of the line of flight. Customarily the wheels of such a set or unit are mounted on the undercarriage leg or other support in such manner, or at such an angle to the ground during a landing approach, that the leading and trailing wheels of the set, group, or unit of tandem wheels contact the ground simultaneously. Since the wheels normally are not rotating at the time of initial contact with the ground, their static inertia (to rotation) must be overcome to start them rotating, resulting in a serious drag load which is hard on the landing wheel tires, and which produces some tendency for the aircraft to nose over.

Various proposals have heretofore been put forward to overcome these disadvantages, for example by providing the landing wheels or tires with flaps operating by the air flow to "spin up" or start the wheels rotating before landing. Such arrangements, however, are subject to the disadvantage that they increase wind resistance. It also has been proposed to provide special motors for "spinning up" the wheels just before landing; but the penalties of increased weight, cost, and complexity of the contact equipment attending such expedients are apparent.

An object of the present invention is to provide an aircraft landing gear construction in which relatively rotatable tandem wheels of a set of fore-and-aft spaced wheels are normally so biased that when the aircraft approaches the ground for a landing one of the wheels is lower than its associated tandem wheel, the arrangement being such that the lower wheel contacts the ground first and is started to rotate, after which the biasing means enables the other wheel to move downwardly, relatively to the aircraft, to contact the ground and to be started to rotate. In this way the drag loads resulting from overcoming inertia of the two wheels are imposed in succession, rather than simultaneously; and the maximum instantaneous drag load is greatly reduced. A related advantage of constructions embodying the present invention is that the reduction in maximum drag loads permits most, if not all, parts of the undercarriage to be more lightly constructed.

An important requirement of the present invention is that the tandem wheels of a unit or set be freely relatively rotatable as well as that they be mounted and biased so as to effect the successive ground contact and "spinning up" referred to above. Accordingly the invention is not adapted for use in landing gear constructions of the endless band type in which not only must the whole band be started to move at one time, but also the wheels mounting the band must simultaneously be started to rotate, thus aggravating the disadvantages due to overcoming the static inertia of a plurality of wheels.

A representative embodiment of the invention is illustrated in the accompanying drawings, in which:

Figure 1 is a view, partly in elevation and partly in vertical section, of mechanism embodying the invention, the parts being shown in the relative positions occupied when an aircraft is about to make a landing, but before the landing wheels contact the ground; and Figure 2 is a view similar to Figure 1, but showing the parts in the relative positions occupied after all of the landing wheels have made contact with the ground.

In each of the figures, the line of flight may, for convenience, be considered as being indicated by the arrow $f$.

The illustrative embodiment of the invention includes a primary undercarriage support 1 adapted to be connected at its upper end to an aircraft in any suitable manner. The primary undercarriage support 1 is in the form of a cylinder or outer tube adapted to receive for sliding movements a secondary undercarriage support 2 in the form of a tube or piston telescopically mounted in the primary support 1 by means of bushings 3.

A fitting 4 secured to the lower end of the secondary undercarriage support or piston 2 is provided with a projection 5 which extends forwardly with reference to the line of flight and carries a pivot 6 on which a bogie 7, in the form of a rigid bar or the like, is pivoted to tilt about an axis transverse to the line of flight. A front or leading ground or landing wheel 8 is directly journalled at 9 on the front of the bogie 7 and forwardly of and below the pivot 6. A rear or trailing ground or landing wheel 10 is directly journalled at 11 on the rear end of the bogie 7 for rotation independently of the wheel 8. As is shown in the drawing the pivotal mounting of the lever 7 on the undercarriage leg part 5 is nearer to the leading end of the lever than its trailing end and the journalling of the wheel 8 on the leading end of the lever is adjacent and at one side of the pivot 6 whereas the wheel 10 is journalled on the other end of the lever and on the other side of the pivot 6. Thus, upon swinging movement of the lever about its pivotal axis 6, the trailing end of the lever and the wheel 10 will travel a greater distance than the leading end of the lever and the wheel 8. Turning of the secondary support or piston 2 relative to the primary support or cylinder 1 is prevented by a pair of links 12 and 13 pivoted to each other at 14, and pivoted respectively at 15 to the primary support 1, and at 16 to the fitting 4 at the lower end of the secondary support 2.

The telescopically arranged primary and secondary undercarriage supports 1 and 2 about and guide the bogie 7 for vertical movements to permit absorption of shocks to be accomplished as will be explained, but are not intended themselves to act as a shock absorber. Instead, in the preferred form illustrated, the secondary support 2 is freely movable vertically within the primary support 1. Absorbing of shocks incident to landing is accomplished solely by a combined shock absorber and biassing device, generally designated 17, which is operatively connected between the primary undercarriage support 1 and the bogie 7 in such relation to the other parts as to function dually in absorbing shocks incident to landing, and also to bias the bogie about its tilting axis 6 to a normal position such that, when the undercarriage supporting structure 1, 2 is approaching the ground at the normal angle of landing approach, one of the wheels 8, 10 will be disposed lower than the other of the wheels. Consequently, the lower wheel will be rotated by contact with the ground, that is "spun up," before the other of the wheels contacts the ground. In the preferred construction, the combined shock absorber and biasing device 17 may be of the kind shown in Patents Nos. 2,564,790 or 2,604,320, and is diagrammatically shown in the drawing as being constituted by an assembly comprising a fluid pressure influenced or responsive cylinder element 18, a piston element 19 and suitable means for limiting extension of the cylinder and piston parts such as an enlarged part 19a on the piston 19 and a flange 18a in the cylinder 18. The cylinder element 18 is pivoted at 20 to an ear 21 on the lower end of the primary undercarriage support cylinder 1; and the piston 19 is pivoted at 22 to the bogie 7. In the form shown, the pivot 6 between the bogie 7 and the projection 5 at the lower end of the secondary undercarriage support is located adjacent to, but is spaced rearwardly from, the front wheel journal 9; and the piston 19 of the combined shock absorbing and biassing device 17 is pivoted to the bogie 7 between the pivot 6 and the journal 11 of the rear wheel 10. The parts are so relatively positioned that the device 17 exerts biassing and shock absorbing force along a line offset from the line of movement of the support 2 in the support 1.

Generally stated, the arrangement of the parts is such that the bogie 7 is arranged in the form of a levered suspension, enabling the piston and cylinder assembly 17 to act both as a cushion for absorbing shocks incident to landing, and for biassing the bogie 7 normally to the position shown in Figure 1.

When an aircraft equipped with landing gear embodying the invention approaches the ground for a landing, the parts will be in the positions shown in Figure 1, the center line of the concentrically arranged primary and secondary undercarriage supports 1—2 being substantially normal to the ground. Because of the lower disposition of the trailing wheel 10, this wheel will contact the ground, and will be "spun up," i. e., will be started to rotate, before the leading wheel 8 contacts the ground. The vertical load component, acting through the wheel 10, will then tilt the bogie counter-clockwise about the pivot 6, as will be permitted by collapsing of the combined shock absorbing and biassing device 17, causing the leading wheel 8 to be moved into engagement with the ground, whereupon it, too, will be started to rotate. Imposition of substantial landing load will effect upward movement of the secondary undercarriage support 2 within the primary undercarriage support 1 against the shock absorbing cushion provided by the piston and cylinder assembly 17. Thus, the device 17 influences the position of the bogie relative to the leg parts by functioning dually as a shock absorber and as a means for biassing the bogie 7 to its normal position as indicated in Figure 1, but nevertheless is yieldable to enable the bogie 7 to be moved to its Figure 2 position after the rear wheel 11 has been "spun up."

The device 17 is of a capacity to delay substantially contact of the leading wheel 8 with the ground until the trailing wheel 10 is rotating at substantial speed. However, the capacity of the device 17 is still such as to permit relative vertical movement of the wheels 8 and 10 to bring the wheel 8 into contact with the ground after the wheel 10 is rotating at the desired speed. Consequently, the two wheels 8 and 10 are started to rotate successively, so that the drag load due to their inertia (to rotate) will be divided or split, and the maximum instantaneous drag load will be minimized.

The construction disclosed embodies the invention in a preferred form, but it is intended that the disclosure be illustrative rather than definitive of the invention, and may be adapted to bogies carrying more than two wheels in tandem, or more than one pair of wheels in tandem, for example, two pairs of wheels in tandem, one on each side of the bogie 7. The invention is defined in the claims.

It should be understood that the so called free travel of the secondary undercarriage support 2 in the primary undercarriage support 1 is limited. This limitation of travel is obtained by the complemental stop means 23 and 3, the bushing 23 being fixed to the secondary undercarriage support and abutting the bushing 3 fixed to the primary undercarriage support 1. It also should be understood that the travel of the piston 19 of the shock absorbing device 17 is larger than the travel of the leg part 2 to allow for the biassing of the rear wheels 8, 10 before landing.

It should further be understood that any loads on the wheels will be transmitted on the undercarriage structure and the aircraft via the frame 7. The only vertical shock absorbing reaction comes from the device 17 through the pin 22 in the bogie frame 7, and the load distribution between the front and rear wheels being dependent on the distance of their axles 9 and 11 respectively from the pin 22. If this distance is equal, then the load between the front and rear wheels will be substantially equal.

We claim:

1. In an aircraft landing gear construction, a primary undercarriage support; a secondary undercarriage support mounted on said primary undercarriage support for vertical movements relative thereto; a bogie; two landing wheels journalled on said bogie for independent relative rotation and spaced fore-and-aft of each other so that one is leading and the other is trailing with respect to the line of flight; means mounting said bogie on said secondary undercarriage support for tilting relatively to said secondary undercarriage support about an axis transverse to the line of flight and for vertical movements together with said secondary undercarriage support; and a combined shock absorbing and biasing device operatively connecting said primary undercarriage support to said bogie and being positioned to exert force along a line offset from the line of movement of said secondary undercarriage support relative to said primary undercarriage support, both to absorb shocks in such relative movement and to bias said bogie to such a position that said wheels are normally maintained so relatively positioned vertically that at the normal angle of said undercarriage support to the ground during landing approach one of said wheels is lower than the other of said wheels, whereby the lower wheel will contact the ground before the other of said wheels contacts the ground, said combined shock absorbing and biasing device being of a capacity to delay substantially contact of said other of said wheels with the ground until said lower wheel is rotating in contact with the ground, and then to permit tilting of said bogie to bring said other of said wheels into contact with the ground, said combined shock absorber and biassing device constituting the sole means for substantially cushioning shock between said undercarriage supports and for controlling the tilted position of said bogie on said secondary undercarriage support.

2. An aircraft landing gear construction as set forth in claim 1 in which said secondary undercarriage support is mounted on said primary undercarriage support for vertical sliding movement.

3. An aircraft landing gear construction as set forth in claim 1 in which said primary undercarriage support comprises a cylinder, and said secondary undercarriage support comprises a piston guided for vertical movement in said cylinder.

4. An aircraft landing gear construction as set forth in claim 1 in which said transverse axis is located between said landing wheels, and in which said combined shock absorbing and biasing device comprises a fluid pressure cylinder element and a cooperating fluid pressure piston element, one of said elements being pivoted to said primary undercarriage support, and the other of elements being pivoted to said bogie at a point between said transverse axis and the journal of one of said wheels.

5. An aircraft landing gear construction as set forth in claim 1 in which said secondary undercarriage support is mounted on said primary undercarriage support for vertical sliding movement, said secondary undercarriage support having a projection extending forwardly and being equipped with a pivot adjacent to but spaced rearwardly from the journal of said leading wheel, said pivot mounting said bogie to tilt about said transverse axis, said combined shock absorbing and biasing device being connected to said bogie between said transverse axis and the journal of said rear wheel.

6. An aircraft landing gear construction as set forth in claim 5 in which said combined shock absorber and biasing device is constituted by a fluid pressure piston and cylinder assembly.

7. An aircraft landing gear construction as set forth in claim 6 in which said piston and cylinder assembly is inclined relatively to the line of relative vertical movement between said undercarriage supports.

8. An aircraft landing gear construction as set forth in claim 1 in which said bogie is constituted by a rigid member and in which said wheels are directly journalled with the journal axes in fixed spaced relation.

9. A component of aircraft alighting gear comprising a two part telescopic leg having a lower part slidable relative to a fixed upper part; a lever pivotally attached to the lower part of said leg; a first wheel journalled on one end of said lever; a second wheel journalled on the other end of said lever; and shock absorber means extensible to and compressible from a lower limit position and operatively connected between the fixed upper part of said leg and an intermediate point on said lever, said shock absorber means being of a capacity when the aircraft is groundborne to wholly support the weight to be borne by said component, and being adapted in association with the telescopic leg when the aircraft is airborne and the leg fully extended to maintain the second wheel at a lower level than the first wheel.

10. In an aircraft alighting gear construction, a generally upright landing leg formed of a fixed upper and a slidable lower part relatively telescopingly interconnected; complemental stop means carried by said parts and interengageable to limit downward movement of the lower part relative to the upper part; a lever pivotally mounted upon a transverse axis nearer one of its ends than its other end on the lower leg part; a first wheel journalled on said one end of said lever adjacent and at one side of the pivotal mounting of said lever; a second wheel journalled on the other end of said lever at the other side of said pivotal mounting; and shock absorber means operatively interconnecting and reacting between said fixed part of the leg and the lever at a point intermediate the first and second wheels to yieldingly resist upward swinging movement of said other end of the lever and the second wheel about the lever's pivotal mount upon the lower leg part, and to resist bodily upward movement of the lever and both wheels with the lower leg part relative to the upper leg part, said shock absorber means including means extensible to and compressible from a lower limit position to limit down-swinging of said other end of the lever to a position wherein, when the aircraft is airborne and said stop means are interengaged, the second wheel is sufficiently lower than the first wheel that the second wheel will touch down first, and will swing upwardy with said other end of the lever, and thereafter upon touching down also of the first wheel both wheels will rise bodily relative to the upper leg part, in both instances against the resistance of said shock absorber means.

11. In an aircraft landing gear construction, an undercarriage support comprising a fixed upper part and a slidable lower part relatively telescopingly interconnected; stop means carried by said parts for limiting downward movement of the lower part relative to the upper part; a bogie pivotally mounted nearer one of its ends than its other end on said lower part for swinging movement about an axis transverse to the line of flight and for bodily movement with said lower part, said one end of said bogie travelling a shorter distance than the other end of said bogie upon swinging movement of said bogie; a first wheel journalled for rotation on said one end of said bogie adjacent and at one side of the pivotal mounting of said bogie; a second wheel journalled for rotation on the other end of said bogie at the other side of said pivotal mounting; and yielding means interconnecting said fixed upper part and said bogie at a point on said bogie spaced from the axis of swinging of said bogie, said yieldable means biasing said bogie to a position in which said second wheel is lower than said first wheel when said support is at the normal landing approach angle to the ground, whereby said second wheel will contact the ground before said first wheel contacts the ground, said yieldable means being of such capacity as to yieldingly resist swinging movement of said bogie from said position about the axis of swinging of said bogie thereby permitting said second wheel to be rotated by ground contact before said first wheel contacts the ground, said yieldable means constituting the sole means for substantially cushioning shocks between said support parts and for influencing the position of said bogie on said lower support part.

References Cited in the file of this patent

UNITED STATES PATENTS

| | | |
|---|---|---|
| 1,379,576 | Killen | May 24, 1921 |
| 1,852,230 | Breguet | Apr. 5, 1932 |
| 2,281,351 | Dowty | Apr. 28, 1942 |
| 2,396,318 | De Bell | Mar. 12, 1946 |
| 2,433,830 | Dowty | Jan. 6, 1948 |
| 2,490,485 | Spaeth | Dec. 6, 1949 |